No. 746,760. Patented December 15, 1903.

UNITED STATES PATENT OFFICE.

ANNIE STUDD, OF CHICAGO, ILLINOIS.

FURNITURE-POLISH.

SPECIFICATION forming part of Letters Patent No. 746,760, dated December 15, 1903.

Application filed March 2, 1903. Serial No. 145,826. (No specimens.)

*To all whom it may concern:*

Be it known that I, ANNIE STUDD, a citizen of the United States, residing at Chicago, in the county of Cook and State of Illinois, have invented certain new and useful Improvements in Furniture-Polish; and I do declare the following to be a full, clear, and exact description of the invention, such as will enable others skilled in the art to which it appertains to make and use the same.

This invention relates to new and useful improvements in furniture-polish; and it consists in the provision of certain ingredients and in the manner of compounding the same whereby a superior liquid covering for furniture is produced.

In the composition of my furniture-polish I utilize two ingredients—i. e., beeswax and turpentine. In preparing the same I take one pound of beeswax, boil the same for a period of two hours, and afterward mix the same with one and one-half quarts of turpentine. After the two ingredients have been mixed the mixture is left to cool and afterward boiled for a period of one hour and then allowed to cool and applied in a cool state. If desired, a suitable perfume may be added to the mixture for giving the same an agreeable odor.

Having thus fully described my invention, what I claim as new, and desire to secure by Letters Patent, is—

The process of making furniture-polish, consisting in boiling beeswax by itself and afterward mixing the same with turpentine, then allowing the mixture to cool and afterward boiling the mixture slowly a short while, as set forth.

In testimony whereof I hereunto affix my signature in presence of two witnesses.

ANNIE STUDD.

Witnesses:
JOHN J. CURRAN,
ROBERT W. STEWART.